Feb. 16, 1943.  W. BOUMA  2,311,204
FILM VIEWER
Filed March 13, 1940
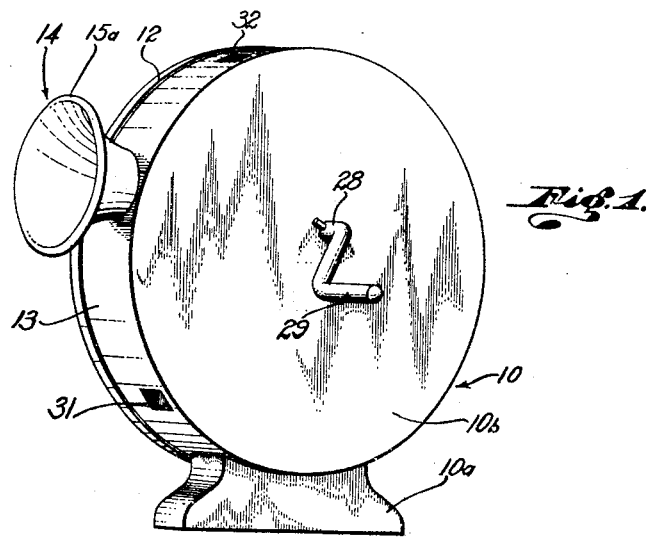
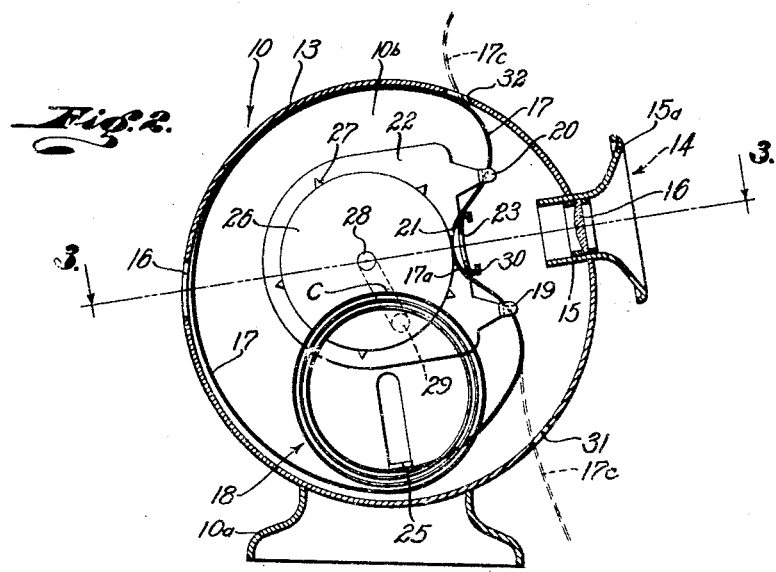
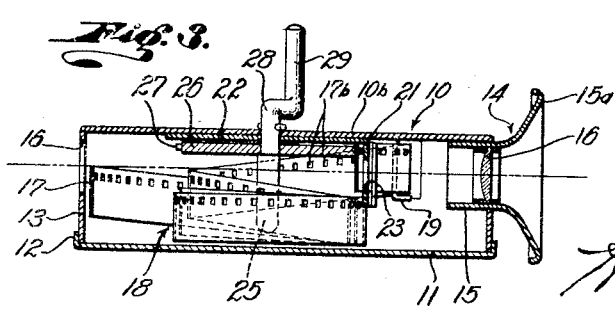
Inventor
WIKKE BOUMA
H. Calvin White
Attorney Patented Feb. 16, 1943

2,311,204

UNITED STATES PATENT OFFICE 2,311,204

FILM VIEWER

Wikke Bouma, Glendale, Calif.

Application March 12, 1940, Serial No. 323,757

6 Claims. (Cl. 88—17)

This invention has to do generally with devices for viewing small size motion picture film, and has for its primary object to provide an improved film viewer incorporating an intermittently effective film moving mechanism of such simplicity as to render the device capable of manufacture at a cost well below that at which similar devices employing known forms of film moving mechanisms could be made. Due to the simplified film movement, as well as additional later described features, the device may be made available as an inexpensive viewer, toy or the like.

Accordingly, one of the principal features of the invention is to provide a novel film moving mechanism of utmost simplicity and yet capable of imparting to the film accurately controlled intermittent movement. Heretofore, even the simpler types of intermittently acting film moving mechanisms have been characterized by numbers of parts and mechanical complications, that have prevented their use in low cost viewers of the type contemplated by the invention. The present film movement may be described generally as comprising, or at least as requiring, only a single film moving element adapted to intermittently engage or advance the film, and suitable film arresting means preferably in form of a stationary film support or guide against which the film is maintained in flexed condition such that at the end of each advancement by the moving element, the film travel becomes immediately arrested by virtue of the film resiliency and resulting frictional engagement with the supporting or guide means. And as will later appear, the flexed condition of the film also is utilized to insure proper engaging and disengaging action of the film moving element.

In the preferred form of the invention the film is advanced and maintained in flexed condition between an aperture plate and a pair of guides positioned at opposite sides of the plate in such offset relation thereto that the film assumes a substantial degree of flexure. The film moving element conveniently may comprise simply a rotatable member, such as a disk or sprocket, having peripheral teeth adapted to engage the perforations in the flexed portion of the film, and spaced apart so that successive engagements of the teeth with the film will move the latter a distance corresponding to the length of one or more frames. Upon disengagement of the teeth from the film, advancing movement of the latter is arrested, as explained, simply by frictional engagement with the guide means. Being thus reduced to the lowest number and simplest arrangement of parts, the film moving mechanism may be made quite inexpensively and assembled in compact arrangement, both of which features contribute to the adaptability of an intermittent film movement to the present type of device.

Another important feature of the invention is the use of an endless film contained within a small-size case, and arranged therein so as to be self-winding in convolute form as the film is advanced by the film moving mechanism. In accomplishing this object, I preferably contain the film and its actuating mechanism in a closed case, which preferably though not necessarily is circular, having a sight opening in its peripheral wall and in a line of vision through the aperture plate inside the case. Being in endless form, the film may continuously be advanced in either direction by the film moving mechanism. A portion of the film, and ordinarily a greater part of its length, is wound upon itself in convolute form within the casing at a location offset from the line of vision therethrough, and the film is guided in its travel so as to be self-winding and releasing in accordance with the operation of the film movement.

The invention has various additional features and objects, but all of these as well as the details of a typical and preferred embodiment of the invention, will be understood to better advantage from the following description. Reference is had throughout the description to the accompanying drawing in which:

Fig. 1 is a perspective view showing the device in elevation;

Fig. 2 is a cross section taken through the sight tube and light aperture, and showing the film movement in elevation;

Fig. 3 is a section on line 3—3 of Fig. 2; and

Fig. 4 is a fragmentary view of the aperture plate adapted for viewing smaller size film.

Referring to the drawing, the device comprises a circular case 10 mounted on a base 10a and having a removable cover 11, the flange 12 of which is fitted to the peripheral wall 13 of the case. Wall 13 has a suitable sight opening, generally indicated at 14, which preferably comprises a sight tube 15 containing a lens 16, the axis or line of vision through which, represented by section line 3—3, is offset somewhat above the axial center C of the case. Tube 15 is flexed outwardly at 15a to provide an eye-piece projecting sufficiently beyond the case to enable the eye to be brought closely against the tube. The opposite wall of the case is provided with a light aperture 16 placed directly in the line of vision.

The case 10 contains an endless film 17 wound within the lower portion of the case in a convolute roll 18 and passing from the roll between a pair of guides 19 and 20, and an aperture plate 21, all integral with a flat frame plate 22 suitably secured to the side wall 10b of the case. Plate 21 has an aperture 23 centered with relation to the line of vision through the eye-piece and light aperture 16. Preferably, the aperture plate 21 has a slight curvature, substantially as illustrated, and is offset inwardly with relation to the guides 19 and 20 so that the portion of the film 17 is flexed to the extent of frictionally engaging the guides and aperture plate under pressure, due to the resiliency of the film, sufficient to arrest the film travel, as will presently appear. The portion 17a of the film directly opposite the aperture 23 is curved toward the actuating element 26 sufficiently to permit free intermittent engagement and disengagement by the latter.

Leaving guide 20, the film follows generally along the wall 13 of the case to the bottom thereof where the film tangentially enters the convolute roll 18. Although a portion of the film may overlap the light aperture 16, the single film thickness will permit passage of sufficient light to give clear vision of the film image opposite the aperture plate 21. A guide finger 25, which may conveniently be punched from the wall of the case, maintains the film roll 18 within the lower portion of the case and prevents it from unwinding to the extent of interfering with vision between the eye-piece and light aperture. It will be observed that the film stretch approaching the guide 19 leaves roll 18 at the inside, with the result that the film itself, by virtue of its confinement and direction by the guides, maintains the roll toward the cover side 11 of the case.

The film moving element comprises a circular disk or sprocket 26 having teeth 27 adapted to engage the film perforations 17b, and spaced apart so that successive engagements of the teeth with the film, will move the latter past aperture 23 one or more frames, depending upon the size of the film or length of the individual frames. Sprocket 26 is carried on shaft 28 positioned at substantially the line of vision, and extending through wall 10b of the case to terminate in a crank handle 29. Upon rotation of the endless film 17 in either direction, the sprocket teeth 27 successively and intermittently advance the film 17 by tangential engagement with the portion of the film opposite the aperture plate. As will be apparent, maintenance of the film in flexed or curved condition at 17a permits tangential approach to and movement of the sprocket teeth from the film, insuring positive engagement and disengagement of the teeth, and accurate intermittent advancements of the film. Preferably the film is flexed outwardly away from the aperture plate so that in the event of any slight misalinement of a film perforation with relation to the entering sprocket tooth, the film is capable of sufficient deflection to compensate for the misalinement. At the point at which each tooth 27 leaves and disengages the film, the film becomes self-arresting by reason of its resiliency and flexed confinement between aperture plate 21 and the guides 19 and 20.

Frictional engagement of the film with the aperture plate and guides to a degree assuring instantaneous arresting of the film between its intermittent advancements by the sprocket, is greatly aided by the condition of reverse curvature in which the film is maintained. Leading from the convolute roll 18, the film loop has a general curvature in an outward direction. Confinement of the film between the aperture plates and guides, however, gives the film a reverse curvature within an intermediate portion of the loop leading from and returning to the convolute roll. Consequently, the resilient force of the film resulting from its reverse deflection or curvature is utilized to give added film pressure against the guides 19 and 20 so that, as stated, the resultant frictional contact will assure instant arresting of the film travel.

Using, for example, 16 mm. film, the spacing of the sprocket teeth 27 may be such as to advance the film one frame at a time, enabling a single film subject to be repeatedly shown. Also it is possible to successively show two or more film sequences or subjects by intermittent movements of alternate frames opposite the aperture plate 21. For example, using 8 mm. film having perforations 17b spaced half the effective distance between the sprocket teeth 27, the latter may move the film intermittently the length of two frames, thus bringing alternate frames opposite the aperture plate. Then by using an endless film having an odd number of frames, continuous movement of the film within the device will first show the action of one complete subject printed on alternate frames, and then the action of a different subject printed on other alternate frames. For the purpose of viewing smaller size film, the aperture plate 21 may carry a removable plate 21a, see the enlarged view Fig. 4, confined between guides 30 and having a smaller aperture corresponding to the film size.

While it is intended that ordinarily the device will be used to view an endless film wholly contained within the case 10, the device may however readily be adapted to viewing of film fed from and led off to the outside of the case, as in editing or inspecting straight film. For this purpose, wall 13 of the case may be provided with openings 31 and 32 through which the film may pass, as indicated by the dotted lines at 17c. Also the device may be used to view endless film running through openings 31 and 32, in a loop outside the case, in which event the openings may be cut through to the open edge of wall 13 to permit insertion of the film loop.

I claim:

1. A device of the character described comprising a case containing a perforated film and having a sight opening in its peripheral wall, a shaft extending through a side wall of the case, a sprocket rotated by said shaft and having teeth spaced apart so as to intermittently engage and advance the film across a line of vision through said sight opening, an aperture plate in said line of vision and across which the film moves, and guides at opposite sides of said plate maintaining the portion of the film engaged by the sprocket teeth in flexed form curving toward the sprocket so that the teeth move tangentially to the film in engaging and disengaging the film perforations.

2. In a device of the character described, an aperture plate, guides at opposite sides of the plate, a perforated film movable across said plate and between said guides and the plate, a portion of the film being longitudinally curved opposite said aperture plate, and a film driving sprocket tangentially engaging said curved portion of the film and having teeth spaced apart so as to only intermittently engage and advance the film during continuous rotation of the sprocket, the film friction against said aperture plate and guides acting to arrest movement of the film between intermittent advancements.

3. A device of the character described comprising a case containing a perforated film and having a sight opening in its peripheral wall, a shaft extending through a side wall of the case, a sprocket rotated by said shaft and positioned within a loop of the film, said sprocket having teeth spaced apart so as to intermittently engage and advance the film across a line of vision through said sight opening, means supporting the film in said line of vision and across which the film moves, and guides at opposite sides of said supporting means maintaining the portion of the film engaged by the sprocket teeth in flexed form curving toward the sprocket so that the teeth move tangentially to the film in engaging and disengaging the film perforations.

4. A device of the character described comprising a case containing an endless perforated film and having a sight opening in its peripheral wall, a shaft extending through a side wall of the case, a sprocket rotated by said shaft and positioned within a loop of the film, said sprocket having teeth spaced apart so as to intermittently engage and advance the film across a line of vision through said sight opening, means supporting the film in said line of vision and across which the film moves, guides at opposite sides of said supporting means maintaining the portion of the film engaged by the sprocket teeth in flexed form curving toward the sprocket so that the teeth move tangentially to the film in engaging and disengaging the film perforations, and means whereby the film is rendered self-winding in a convolute roll within said case.

5. A device of the character described comprising a case containing an endless perforated film and having a sight opening in its peripheral wall, a length of said film being maintained in a condition of substantial curvature in one direction, guide means frictionally engaged by the film and maintaining an intermediate portion of said curved length of the film in reverse curvature, means for intermittently advancing the film across a line of vision through said sight opening, intermittent advancements of the film being arrested by frictional engagement of the film with said guide means, and means whereby the film is rendered self-winding in a convolute roll within said case.

6. A device of the character described comprising a case containing an endless perforated film and having a sight opening in its peripheral wall, a length of said film being maintained in a condition of substantial curvature in one direction, guide means frictionally engaged by the film and maintaining an intermediate portion of said curved length of the film in reverse curvature, a sprocket inside said curved length of the film and having teeth engageable with said reversely curved portion of the film and spaced apart so as to only intermittently advance the film across a line of vision through said sight opening, intermittent advancements of the film being arrested by frictional engagement of the film with said guide means, and means whereby the film is rendered self-winding in a convolute roll within said case.

WIKKE BOUMA.